US012687141B2

(12) United States Patent
Mathes et al.

(10) Patent No.: US 12,687,141 B2
(45) Date of Patent: Jul. 21, 2026

(54) SYSTEM AND METHOD FOR ADJUSTABLE FUEL CANISTER

(71) Applicant: MAHLE International GmbH, Stuttgart (DE)

(72) Inventors: Eric Mathes, Shelby Township, MI (US); Antonio Spadafora, Tecumseh (CA)

(73) Assignee: Mahle International GmbH (DE)

( * ) Notice: Subject to any disclaimer, the term of this patent is extended or adjusted under 35 U.S.C. 154(b) by 24 days.

(21) Appl. No.: 18/760,859

(22) Filed: Jul. 1, 2024

(65) Prior Publication Data

US 2026/0002498 A1 Jan. 1, 2026

(51) Int. Cl.
*F02M 25/08* (2006.01)

(52) U.S. Cl.
CPC ............................... *F02M 25/0854* (2013.01)

(58) Field of Classification Search
CPC .................................................. F02M 25/0854
USPC ......................................................... 123/519
See application file for complete search history.

(56) References Cited

U.S. PATENT DOCUMENTS

2007/0119306 A1* 5/2007 Yamada ........... B60K 15/03504
123/519

* cited by examiner

*Primary Examiner* — Lindsay M Low
*Assistant Examiner* — Omar Morales
(74) *Attorney, Agent, or Firm* — Fishman Stewart PLLC

(57) ABSTRACT

An adjustable evaporative emission system (EVAP) canister has a housing with at least a first chamber and a second chamber. The first chamber has a first opening and a second opening opposite the first opening, and the first chamber has a first chamber maximum capacity to house a fuel vapor filtering medium. The second chamber has a third opening and a fourth opening opposite the third opening, and the third opening is proximate the second opening of the first chamber. The second chamber has a second chamber maximum capacity to house the fuel vapor filtering medium. The housing is configured to receive a plurality of volume adjusting spacers proximate to the second opening and the third opening, where each volume adjusting spacer of the plurality of volume adjusting spacers adjusts at least one of the first chamber maximum capacity and the second chamber maximum capacity.

20 Claims, 7 Drawing Sheets

SYSTEM AND METHOD FOR ADJUSTABLE FUEL CANISTER

TECHNICAL FIELD

The present disclosure generally relates to a fuel vapor emission system and its accompanying fuel vapor canister for the treatment of fuel vapor associated with an internal combustion engine.

BACKGROUND

An Evaporative Emission Control System (EVAP) may be coupled to an internal combustion engine to prevent fuel vapors (e.g., gasoline vapors) from escaping from a fuel tank and fuel system into the atmosphere.

A common EVAP system includes a carbon canister (a.k.a. fuel vapor canister, fuel canister, or EVAP canister) that uses one or more types of activated carbon to capture fuel vapor through adsorption. When an internal combustion engine is not running, fuel vapor from the fuel tank may be passed through activated carbon of the carbon canister so that the fuel vapor is adsorbed therein. That is, air mixed with fuel vapor moves from the fuel tank to the carbon canister via a load port to ensure fuel vapor is not released to the atmosphere. After the fuel vapor/air mixture enters the carbon canister via the load port, activated carbon in the carbon canister adsorbs the fuel vapor in the mixture and clean air (or generally clean air) leaves the carbon canister and is generally allowed to escape to the environment. This is often referred to as the load cycle.

During a purge cycle, clean or generally clean air is passed through the canister while the engine is operating, and previously adsorbed vapor is resorbed into the clean air. In turn, the air/vapor mixture is conveyed into the fuel system where it is used to augment combustion.

Due to a variety of reasons, the type and/or amount of activated carbon needed to adsorb fuel vapor during a loading cycle can vary depending on the size of the fuel tank coupled to the EVAP canister. As such, an EVAP canister coupled to a smaller fuel tank is often a different size than an EVAP canister coupled to a larger fuel tank. Accordingly, different sized EVAP canisters are often needed to accommodate different sized fuel tanks. There are, however, costs associated with manufacturing custom-sized EVAP canisters to accommodate different sized fuel tanks.

Accordingly, there is a need for EVAP canisters that accommodate more than one fuel tank size.

DETAILED DESCRIPTION

Referring to the discussion that follows and the Figures, illustrative approaches to the disclosed systems and methods are described in detail. Although the Figures represent some possible approaches, the Figures are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the Figures and disclosed in the following detailed description.

Figure 1A:
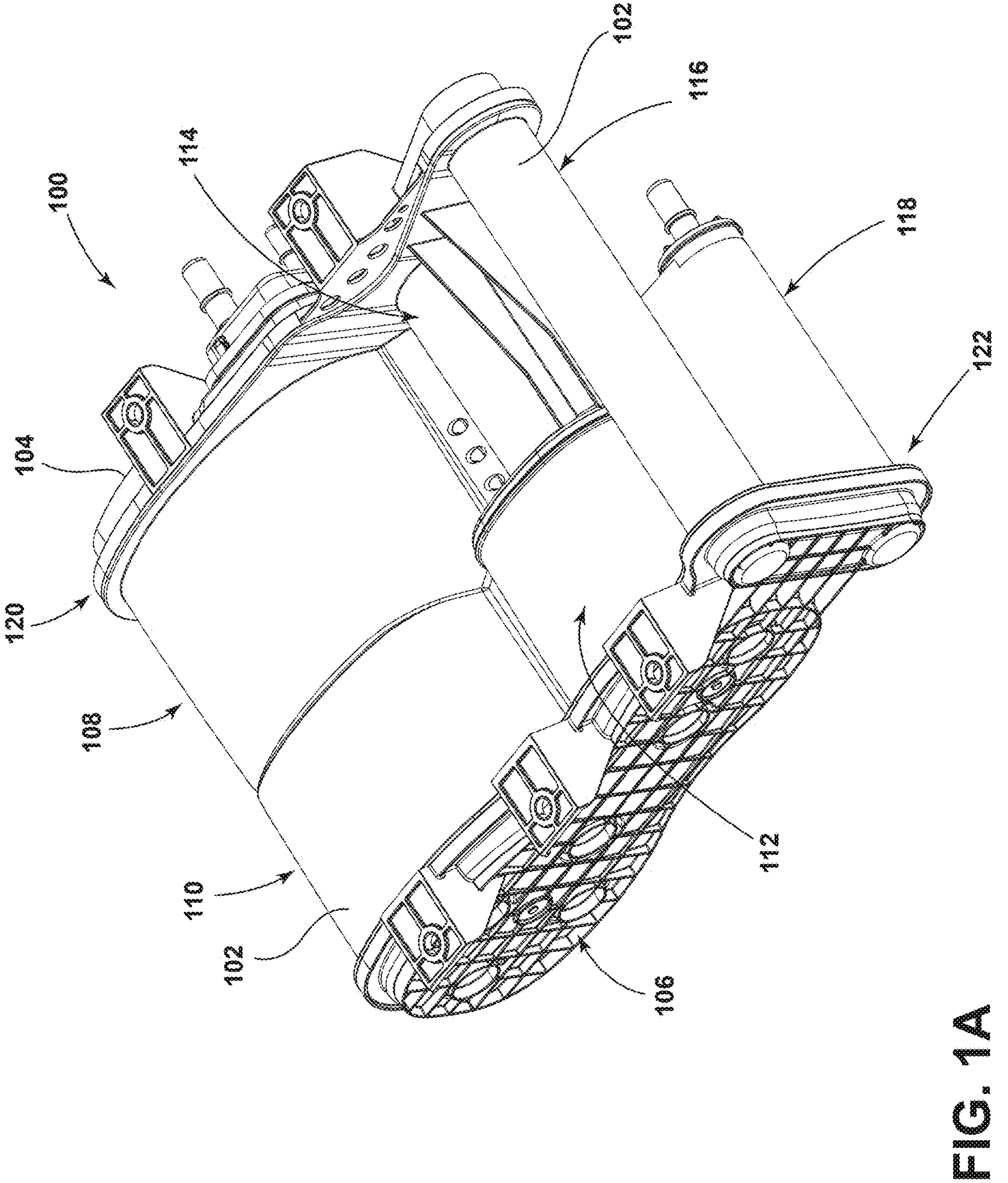
FIG. 1A illustrates a three-dimensional perspective view of an exemplary adjustable EVAP canister.

With reference now to FIG. 1A, a three-dimensional perspective view of portions of an exemplary adjustable evaporative emission system (EVAP) canister 100 is shown. The exemplary adjustable EVAP canister 100 includes, in part, a housing 102, a top cap 104, and a bottom cap 106.

The housing 102 includes six chambers (a.k.a. bed volumes) 108, 110, 112, 114, 116, 118, respectively. While six chambers 110-120 are shown, other exemplary EVAP canisters may include a differing number of chambers (e.g., two or more chambers).

Each chamber 108-118 of the exemplary EVAP canister 100 of FIG. 1A may house some type of fuel vapor filtering medium. The type of fuel vapor filtering medium in each chamber 108-118 need not be the same, nor does each chamber need to house a fuel vapor filtering medium. One, two, three, or more types of fuel vapor filtering mediums may be employed. The fuel vapor filtering medium may include, for example, activated carbon (e.g., pelletized carbon or honeycomb monolith carbon) which is known for temporarily adsorbing fuel vapor.

The top cap 104 covers a top portion 120 of the first chamber 108, the fourth chamber 114, and the fifth chamber 116. The bottom cap 106 covers a bottom portion 122 of the second chamber 110, the third chamber 112, the fifth chamber 116, and the sixth chamber 118.

As will be shown below with respect to FIGS. 1B-1E, the adjustable EVAP canister 100 is configurable such that the volume of fuel vapor filtering media employed in at least the first 108 and/or third chambers 112 can be adjusted, without having to change the housing 102, based on customer needs.

Figure 1B:
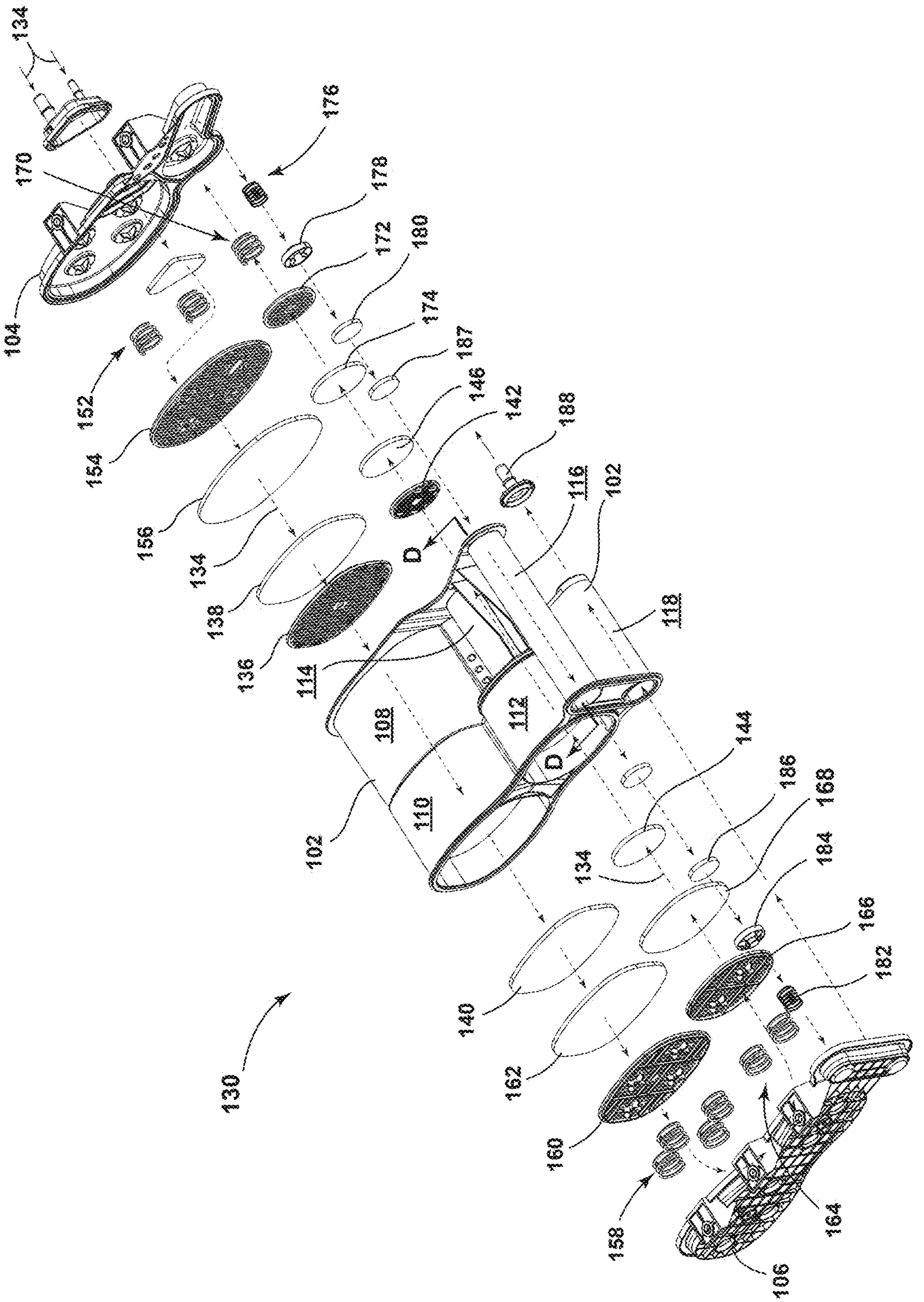
FIG. 1B illustrates an exploded view of the exemplary adjustable EVAP canister of FIG. 1A in an exemplary 60-gallon configuration.
Figure 1C:
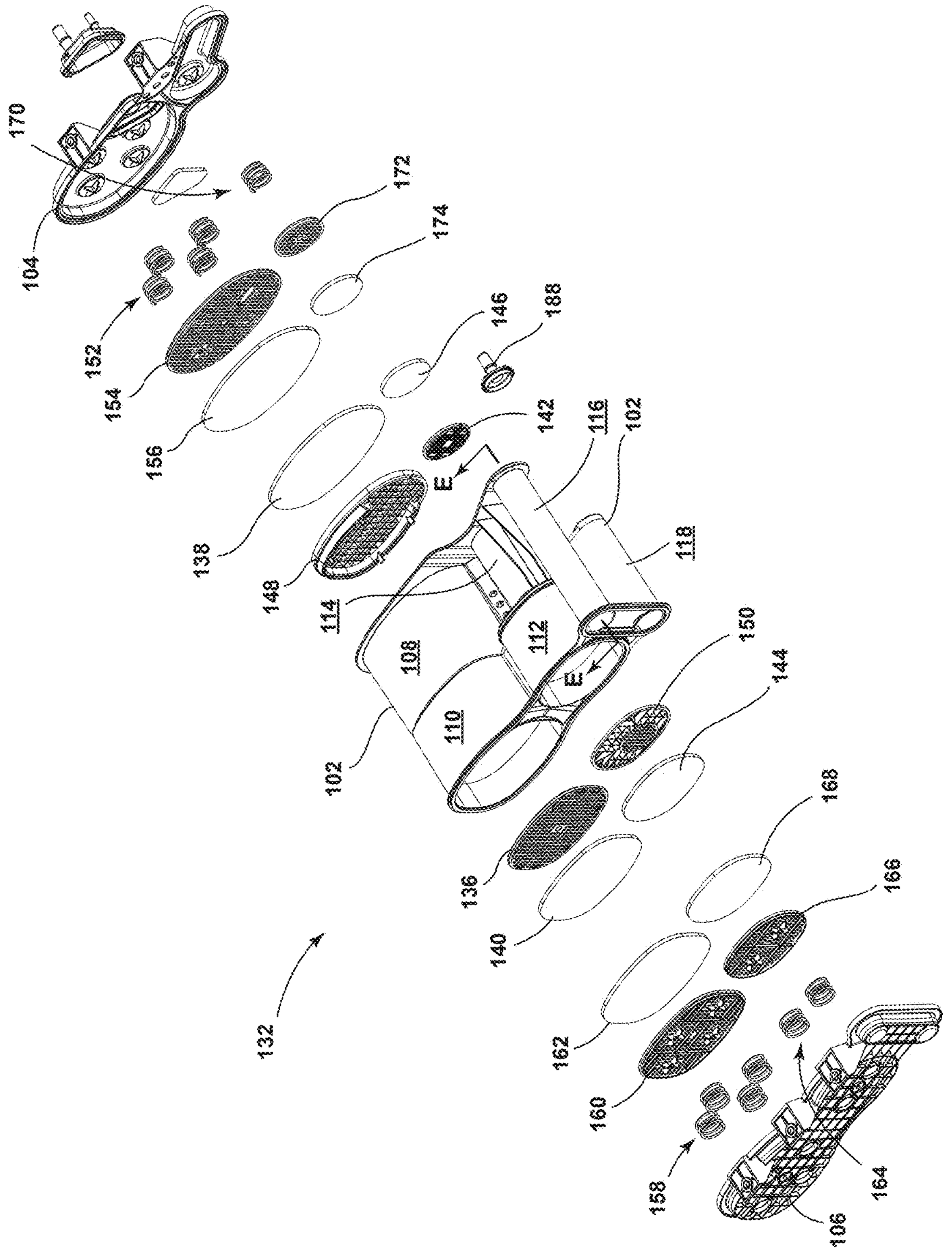
FIG. 1C illustrates an exploded view of the exemplary adjustable EVAP canister of FIG. 1A in an exemplary 100-gallon configuration.

FIG. 1B represents an exploded view 130 of portions of the adjustable EVAP canister 100 in an exemplary 60-gallon configuration. The term "60-gallon configuration" simply refers to an exemplary configuration that may be employed if the EVAP canister 100 were coupled to an exemplary 60-gallon fuel tank. Other configurations are envisioned. For example, FIG. 1C illustrates an exploded view 132 of portions of the EVAP canister 100 in an exemplary 100-gallon configuration.

In addition to illustrating portions of the EVAP canister 100, FIG. 1B also shows an exemplary flow path 134 of fuel vapor through the EVAP canister 100 during a loading cycle. According to the flow path 134, the fuel vapor follows a path that proceeds consecutively through each chamber 108-118, beginning with the first chamber 108. Though not shown, the same flow path proceeds through the canister 100 of FIG. 1C during a loading cycle as well.

The 60-gallon configuration of FIG. 1B shows a first volume adjuster spacer 136 that, once assembled, divides the first chamber 108 from the second chamber 110. A first pair of covers 138, 140 (e.g., foam or foam-like inserts) can be placed on either side of the first volume adjusting spacer 136 to ensure that fuel vapor filtering media in the first chamber does not mix with fuel vapor filtering media in the second chamber.

A second volume adjuster spacer 142 divides the third chamber 112 from the fourth chamber 114 once assembled. A second pair of covers 144, 146 (e.g., foam or foam-like inserts) can be placed on either side of the second volume adjusting spacer 142 to ensure that fuel vapor filtering media in the third chamber 112 does not mix with fuel vapor filtering media in the fourth chamber 114.

In contrast to the 60-gallon configuration shown in FIG. 1B, the exemplary 100-gallon configuration shown in FIG. 1C includes an additional first volume adjusting spacer 148. Once assembled, the first volume adjusting spacer 136 and the additional first adjusting spacer 148 of FIG. 1C divide the first chamber 108 from the second chamber 110. Further details regarding the placement of these volume adjusting spacers 136, 148 will be shown in FIG. 1D.

The exemplary 100-gallon configuration of FIG. 1C may also include an additional second volume adjusting spacer 150. Once assembled, the second volume adjusting spacer 142 and the additional second volume adjusting spacer 150 together divide the third chamber 112 from the fourth chamber 114. Further details regarding the placement of these volume adjusting spacers 142, 150 will be shown in FIG. 1E.

Referring back to FIG. 1B, the EVAP canister 100 may also include a set of first chamber springs 152, a first chamber endplate 154, and a first chamber endplate cover 156. Once assembled, the springs 154 apply pressure to the first chamber endplate 154 and endplate cover 156, which in turn helps to contain filtering media (not shown) that rests between the endplate cover 156 and the first volume adjusting spacer plate cover 138.

In a similar manner, a set of second chamber springs 158 apply pressure to a second chamber endplate 160 and second chamber endplate cover 162, which in turn helps to contain filtering media (not shown) that rests between the second chamber endplate cover 162 and the second volume adjusting spacer plate cover 140.

Next, a set of third chamber springs 164 applies pressure to a third chamber endplate 166 and third chamber endplate cover 168, which in turn helps to contain filtering media (not shown) that rests between the endplate cover 168 and the volume adjusting spacer plate cover 144.

With reference to the fourth chamber 114, a spring 170 applies pressure to a fourth chamber endplate 172 and its cover 174, which in turn helps to contain filtering media (not shown) that may rest between the endplate cover 174 and the respective spacer plate cover 146 of the second volume adjusting spacer 142.

With respect to the fifth chamber 116, a top-cap spring 176 applies pressure to a top-cap endplate 178 and its cover 180, while a bottom-cap spring 182 applies pressure to a bottom-cap endplate 184 and its cover 186. As such, a fuel vapor filtering media may be contained in the fifth chamber if desired. An additional cover 187 may be employed to shorten the length of the fifth chamber 116 if desired.

A port 188 at the end of the sixth chamber 118 helps enable flow through the canister.

Figure 1D:
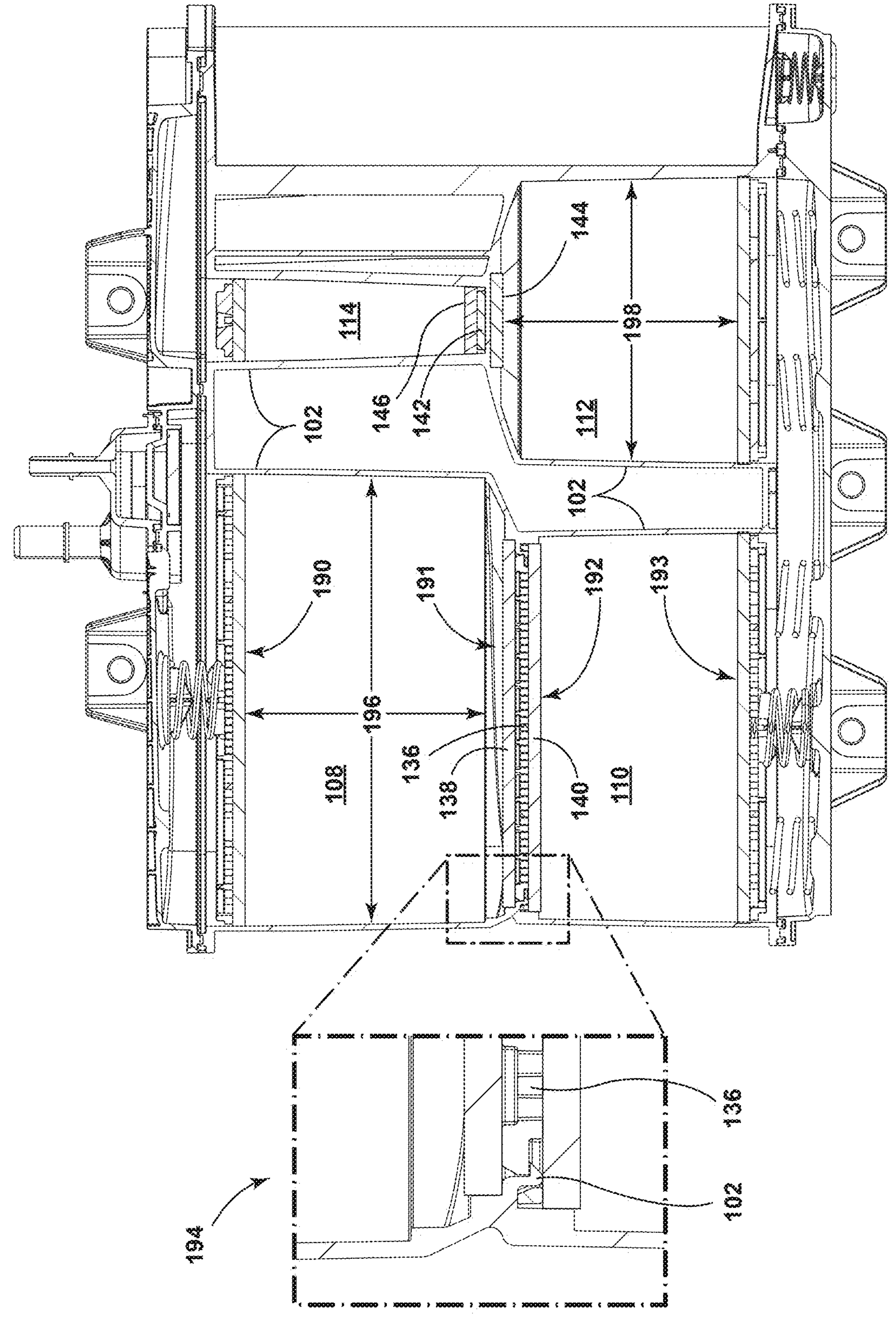
FIG. 1D illustrates a cross-sectional view along D-D of the exemplary adjustable EVAP canister of FIG. 1B.
Figure 1E:
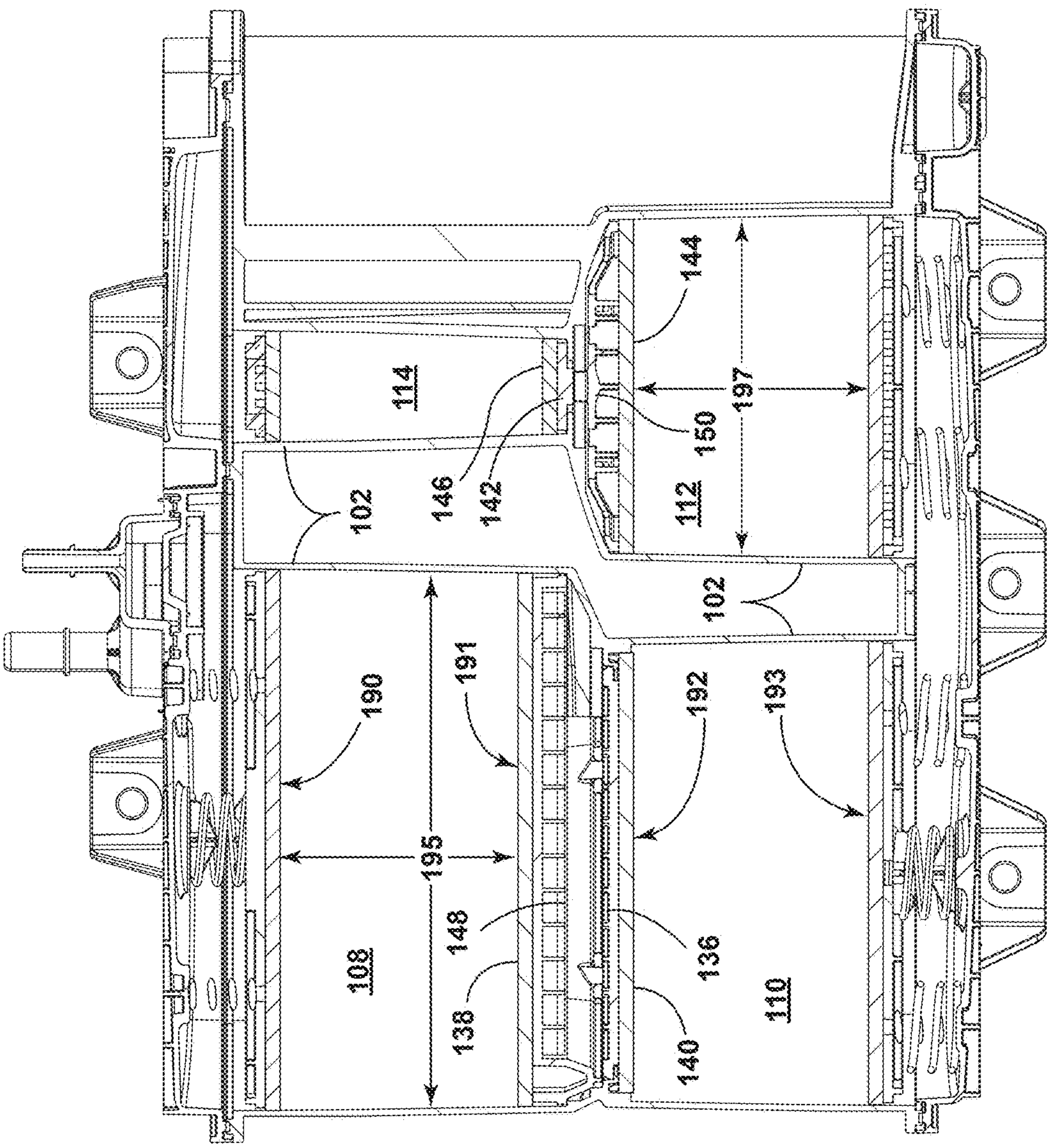
FIG. 1E illustrates a cross-sectional view along E-E of the exemplary adjustable EVAP canister of FIG. 1C.

A cross-sectional view along D-D of FIG. 1C is shown in FIG. 1D and a cross-sectional view along E-E of FIG. 1C is shown in FIG. 1E. Shown in both FIGS. 1D and 1E, are the first, second, third, and fourth chambers 108, 110, 112, 114, respectively.

FIGS. 1D and 1E also show that the first chamber 108 includes a first opening 190 and a second opening 191 opposite the first opening 190, while the second chamber 110 includes a third opening 192 and a fourth opening 193 opposite the third opening 192. The third opening 192 of the second chamber 110 is proximate the second opening 191 of the first chamber 108.

Terms such as "first," "second," "third," "fourth," and etc. are merely used to distinguish the respective elements (e.g., openings) and are not necessarily intended to refer to a quantity or order. For example, the second chamber 110 includes two openings, which are referred to as the third opening 192 and the fourth opening 193.

With respect to FIG. 1D, the first volume adjusting spacer 136, which is proximate the second 191 and third opening 192, is shown dividing the first chamber 108 from the second chamber 110. Similarly, the second volume adjusting spacer 142 is shown dividing the third chamber 112 from the fourth chamber 114. The first 136 and second volume adjusting spacers 142 may, for example, be snap-fit coupled to the housing 102 to enable placement between the first 108 and second chambers 110. An exemplary representation of such a snap-fit is shown in an expanded view 194 of FIG. 1D, where a portion of the housing 102 snap-fits to a portion of the first volume adjusting spacer 136. Other coupling scenarios, however, are also envisioned.

In contrast to FIG. 1D, FIG. 1E shows the second additional volume adjusting spacer 148 also being employed to divide the first chamber 108 from the second chamber 110. The second additional volume adjusting spacer 148 may, for example, be snap-fit to the first spacer 136 and/or to the housing 102. The pair of covers 138, 140 may be placed on either side of the spacer pair 136, 148 to ensure filtering media in the first chamber 108 does not mix with filtering media in the second chamber 110.

Due to the size of the additional volume adjusting spacer 148, a volume 195 in the first chamber 108 available for fuel filtering media is less than a volume 196 available for filtering media in the first chamber 108 of FIG. 1D, despite the housing 102 remaining unchanged.

If the volume 196 of the first chamber shown in FIG. 1D is considered to be a maximum capacity that may be filled with a fuel vapor filtering medium, then the volume 195 of the first chamber 108 shown in FIG. 1E is a lower capacity than the maximum capacity largely due to the size of the additional volume adjusting spacer 148.

In light of FIGS. 1D and 1E, it is clear that the volume of the first chamber 108 can be varied based on the size of the additional first volume adjusting spacer 148. If the first additional volume adjusting spacer were larger than that shown in FIG. 1E, even less volume in the first chamber 108 would be available to house fuel vapor filtering media. As such, the same housing 102 may be employed with differing sized fuel tanks.

FIG. 1E also illustrates the additional second volume adjusting spacer 150 being employed to divide the third chamber 112 from the fourth chamber 114. The pair of covers 144, 146 may be used to ensure that filtering media in the third chamber 112 does not mix with filtering media in the fourth chamber 114.

Due to the size of the second additional volume adjusting spacer 150, a volume 197 available in the third chamber 112 for fuel filtering media in FIG. 1E is less than a volume 198 available for filtering media in the third chamber 112 of FIG. 1D.

A comparison of FIGS. 1D and 1E shows how the additional first 148 and second volume adjusting spacers 150 change the volume of the first 108 and third chambers 112. These volumes can be manipulated by changing the size of the first and second additional volume adjusting spacers 148, 150. With this in mind, a plurality of volume adjusting spacers, each being a different size, may be manufactured for the housing 102. As such, the volume available for fuel vapor filtering media may be manipulated based on the spacer(s) employed without having to change the housing 102.

While FIGS. 1D and 1E illustrate manipulating the volume of the first and/or third chambers 108, 112 using volume adjusting spacer plates, other examples may allow for the manipulation of the volume of the second and/or fourth chambers 110, 114 as well, or alternatively, using additional volume adjusting spacer plates.

Still further, other examples are also envisioned. An adjustable EVAP canister may include one or more chambers and the volume adjusting spacers may be used to adjust the volume of the one or more chambers.

As mentioned above, the adjustable EVAP canister 100 of FIGS. 1A-1E is merely exemplary and volume adjusting spacers may be employed in other housing shapes and configurations having differing amounts of chambers. Further, while FIGS. 1C-1E illustrate spacer pairs being employed to decrease the volume of respective chambers, other examples may simply employ a single spacer to decrease the volume of a respective chamber. For example, with respect to FIG. 1E, instead of employing the first spacer 136 and the additional first spacer 148 to decrease the volume of the first chamber 108, a single larger spacer (not shown) could instead be employed to set the volume of the first chamber 108 to the second volume 195 or any other desired volume. Alternatively, more than two spacers could be stacked to set the volume of the respective chamber.

As represented through FIGS. 1A-1E, an adjustable EVAP canister is presented. By using one or more volume adjusting spacers, a fuel canister can be modified so that it can be used for a variety of fuel tanks sizes. As such, one fuel canister housing (e.g., the housing 102 of FIGS. 1A-1E) can be manufactured and volume adjusting spacers can be used to modify the fuel canister for different applications. Accordingly, EVAP canister manufacturing costs may be reduced.

Figure 2:
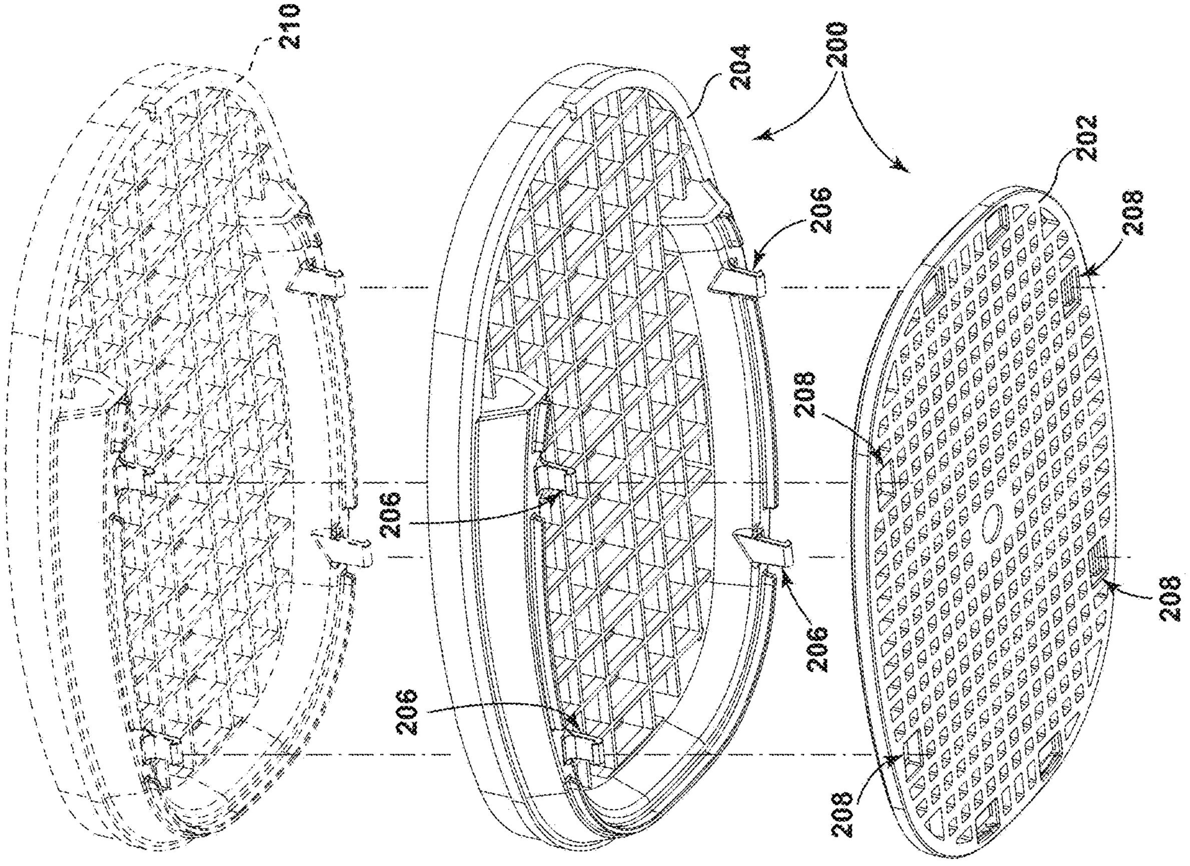
FIG. 2 illustrates an exploded view of an exemplary volume adjusting spacer pair.

Referring now to FIG. 2, an exploded perspective view of an exemplary volume adjusting spacer pair 200 is shown. The volume adjusting spacer pair 200 includes a first volume adjusting spacer 202 and a second volume adjusting spacer 204 (a.k.a. additional first volume adjusting spacer). According to the example shown, the second volume adjusting spacer 204 may include hooking features 206 that can be snap-fit into receiving portions 208 of the first volume adjusting spacer 204. As such, a manufacturing run may include forming a plurality of housings (e.g., the housing 102 of FIGS. 1A-1E), each having the same dimensions, and coupling the first spacer 202 to the housing. Then, if the customer needs dictate, a second spacer (e.g., the second volume adjusting spacer 204) of the appropriate size may also be coupled to the housing via snap-fitting the second volume adjusting spacer 204 to the first volume adjusting spacer 202. In other examples, the quantity and shape of hooking features 206 and receiving portions 208 may differ than those shown in FIG. 2. Further, if hooking features are employed, they could instead be included on the first volume adjusting spacer 202, with the receiving portions being integrated instead into the second volume adjusting spacer 204.

In yet another example, instead of snap-fitting the second spacer to the first spacer, the second spacer may instead be directly coupled to the housing. Regardless of how the spacers are coupled to the housing, the differing sized spacers allow the volume of the respective chamber to be custom configured to customer needs. For example, the larger the second spacer is, the more the volume of a respective chamber can be decreased.

As the example represented in FIG. 2 illustrates, two spacers 202, 204 coupled together may be employed to vary the volume of the respective chamber. According to other examples, however, one or more than two spacers (see, e.g., additional or third spacer 210) may be employed to vary the chamber volume. Further, one spacer being the size of the two combined spacers could instead be employed. Alternatively, three or more spacers having a combined volume as the spacer pair 200 could also be employed.

Accordingly, a plurality of additional spacers, each being a different size, may be manufactured so that the volume of the respective chamber may be manipulated according to customer needs, without having to change the housing dimensions.

Figure 3:
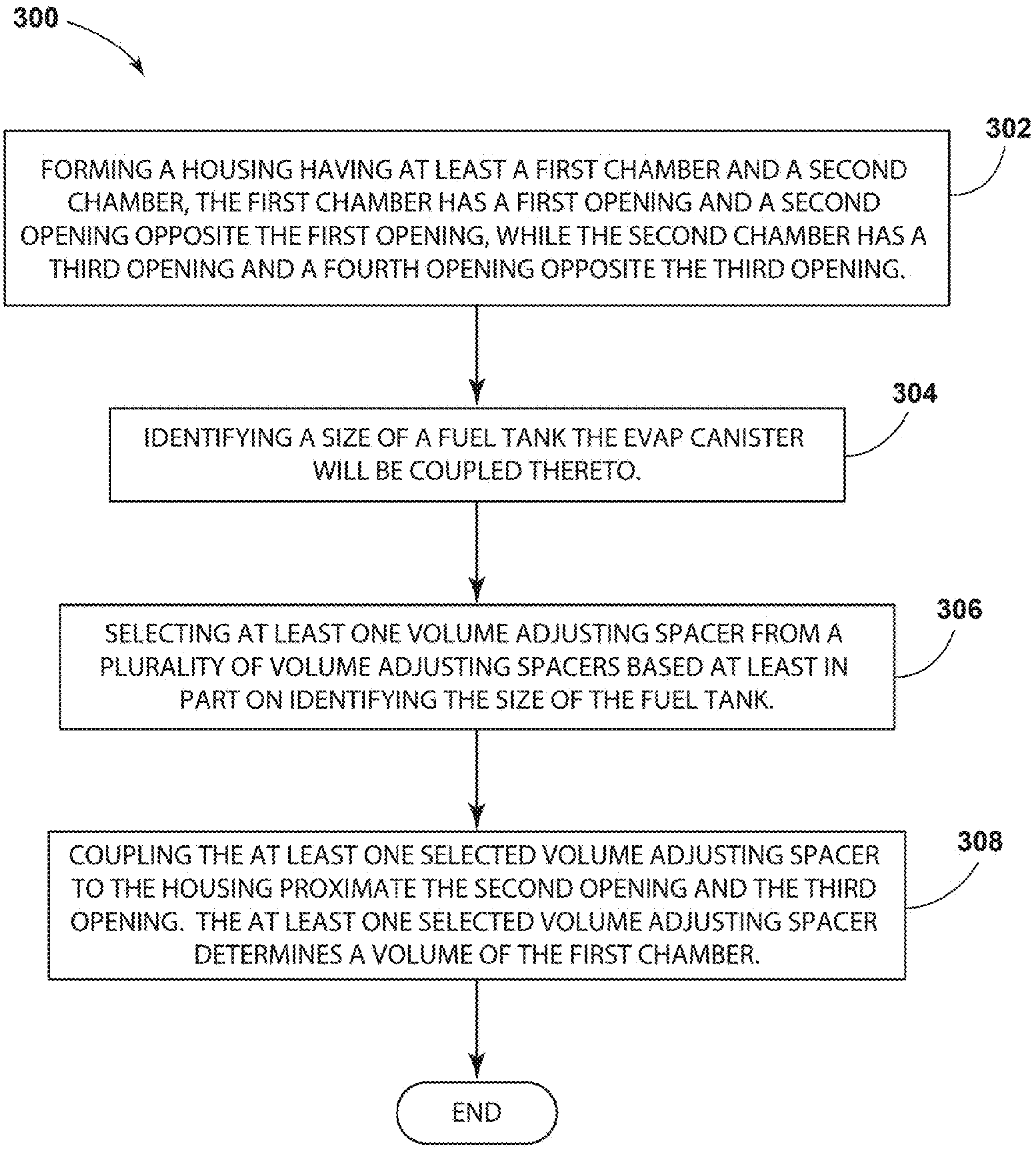
FIG. 3 shows an exemplary technique for manufacturing an adjustable EVAP canister.

With reference now to FIG. 3, an exemplary technique 300 for manufacturing an adjustable evaporative emission system (EVAP) canister is shown. Process control begins at block 302, where forming a housing having at least a first chamber and a second chamber is carried out. The first chamber has a first opening and a second opening opposite the first opening, while the second chamber has a third opening and a fourth opening opposite the third opening (see, e.g., the first and second chambers 108, 110 of FIGS. 1D-1E). The third opening of the second chamber is proximate the second opening of the first chamber.

Each chamber is configured to house a fuel vapor filtering medium, though they need not house the same type of fuel vapor filtering medium.

Upon forming at least the first and second chambers, process control proceeds to block 304, where identifying a size of a fuel tank the adjustable EVAP canister will be coupled thereto is carried out. The quantity of fuel vapor filtering media needed to effectively mitigate the escape of fuel vapor into the environment may be dependent, at least in part, on the size of the fuel tank coupled to the EVAP canister.

As such, after identifying the fuel tank size, process control proceeds to block 306, where selecting at least one volume adjusting spacer from a plurality of volume adjusting spacers is carried out. The selection is based at least in part on identifying the size of the fuel tank carried out at block 304. As mentioned above, the volume adjusting spacer employed determines, at least in part, the volume of the chamber that is available to receive the appropriate fuel vapor filtering medium. For example, if the fuel tank is a 100-gallon fuel tank, an appropriately sized spacer for the 100-gallon application may be selected from the plurality of volume adjusting spacers.

As another example, if tank will be a 60-gallon fuel tank, two spacers may be selected to appropriately size the first chamber. In still yet another example, a single spacer or more than two spacers may be used to appropriately size the first chamber.

Regardless if one or more spacers will be employed to size the volume of the first chamber, the volume adjusting spacers includes at least a first spacer (e.g., spacer 136 of FIG. 1B) and a second spacer (e.g., spacer 148 of FIG. 1C) that is a different size than the first spacer.

Still referring to the technique of FIG. 3, after selecting the at least one volume adjusting spacer, process control proceeds to block 308, where coupling the at least one selected volume adjusting spacer to the housing proximate the second opening and the third opening occurs. With the appropriate volume adjusting spacer, the volume in the first chamber available for the fuel vapor filtering medium is determined.

Coupling the at least one selected volume adjusting spacer to the housing could include coupling the first spacer to the housing and coupling the second spacer to the housing. That is, two volume adjusting spacers could be used to set the chamber to its appropriate volume based on the fuel tank size.

Coupling the second spacer to the housing could include coupling the second spacer to the first spacer that is coupled to the housing. In other words, the first spacer could be snap-fit to the housing and the second spacer could be snap-fit to the first spacer, thus coupling the second spacer to the housing via the first spacer.

Instead of coupling the second spacer to the housing via the first spacer, the second spacer could be coupled directly to the housing (e.g., snap-fit directly to the housing).

After coupling the at least one volume adjusting spacer to the housing, the technique 300 may come to an end.

However, instead of coming to an end, the technique 300 may include identifying a different fuel tank size the EVAP canister will be coupled thereto. For example, after a manufacturing run is carried out for the first fuel tank size, another manufacturing run could start using the same housing, but configured for a different fuel tank size.

As such, after identifying a different fuel tanks size, selecting at least one other volume adjusting spacer from the plurality of volume adjusting spacers based, at least in part, on identifying the different fuel tank size can be carried out.

Next, coupling the at least one other selected volume adjusting spacer to a different housing (though with the same dimensions as the first housing) can be carried out to set the chamber volume in that housing for the appropriate amount of fuel vapor filtering media.

As detailed above, the technique allows for the same manufacturing line to produce EVAP canisters for differing fuel tank sizes. Since the same housing can be employed for multiple fuel tank sizes, the need for differing supply parts is minimized. Further, the manufacturing inefficiencies that may occur when changing over to different configurations (e.g., changing from the manufacture of 60-gallon EVAP canister configurations to the manufacture of 100-gallon EVAP canister configurations) is also minimized. Simply put, once a new fuel tank size is identified, different spacer plates can be used in the same housing to accommodate the new fuel tank size.

With regard to the processes, techniques, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Further, when introducing elements of various embodiments of the disclosed materials, the articles "a," "an," "the," and "said" are intended to mean that there are one or more of the elements. The terms "comprising," "including," and "having" are intended to be inclusive and mean that there may be additional elements other than the listed elements. Next, any numerical examples in the following discussion are intended to be non-limiting, and thus additional numerical values, ranges, and percentages are within the scope of the disclosed embodiments. Still further, the use of terms such as "first," "second," "third," and the like that immediately precede an element(s) do not necessarily indicate sequence unless set forth otherwise, either explicitly or inferred through context.

While the preceding discussion is generally provided in the context of a material used in connection with vehicles, it should be appreciated that the present techniques are not limited to such limited contexts. The provision of examples and explanations in such a context is to facilitate explanation by providing instances of implementations and applications. The disclosed approaches may also be utilized in other contexts or configurations, such as the context of other systems that employ an internal combustion engine that may not be a vehicle.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. An adjustable evaporative emission system (EVAP) canister comprising:

a housing comprising:

a first chamber having a first opening and a second opening opposite the first opening, wherein the first chamber has a first chamber maximum capacity to house a fuel vapor filtering medium; and a second chamber having a third opening and a fourth opening opposite the third opening, the third opening is proximate the second opening of the first chamber, wherein the second chamber has a second chamber maximum capacity to house the fuel vapor filtering medium;

the housing is configured to receive;

a first volume adjusting spacer couplable to at least one of the first chamber and the second chamber proximate the second and third openings, wherein the first volume adjusting spacer enables the first chamber to house a first volume of the fuel vapor filtering medium; and a second volume adjusting spacer proximate to the first volume adjusting spacer, the second volume adjusting spacer is couplable to at least one of the first chamber and the second chamber proximate the second and third openings, wherein the second volume adjusting spacer enables the first chamber to house a second volume of the fuel vapor filtering medium, and wherein the first volume is greater than the second volume, and wherein the housing is configured to receive the first and second volume adjusting spacers such that a flow path of fuel vapor passes therethrough.

2. The adjustable EVAP canister of claim 1, wherein i) the first volume adjusting spacer is configured to set the first chamber to the first volume to house the fuel vapor filtering medium when employed without the second volume adjusting spacer and ii) the second volume adjusting spacer is configured to set the first chamber to the second volume to house the fuel vapor filtering medium when employed with the first volume adjusting spacer.

3. The adjustable EVAP canister of claim 2 wherein the housing further comprises a third chamber and a fourth chamber, and wherein the housing is further configured to i) receive a third volume adjusting spacer to set a capacity of at least one of the third and fourth chambers to house the fuel vapor filtering medium and ii) a fourth volume adjusting spacer to decrease the capacity of the at least one of the third and fourth chambers to house the fuel vapor filtering medium.

4. The adjustable EVAP canister of claim 2 wherein the housing is configured to receive the second volume adjusting spacer snap-fitted to the first volume adjusting spacer.

5. The adjustable EVAP canister of claim 1 wherein the housing is configured to receive the first volume adjusting spacer coupled to the second volume adjusting spacer.

6. The adjustable EVAP canister of claim 1 wherein the first chamber is set to the second volume when the second volume adjusting spacer is coupled to the housing and the adjustable EVAP canister does not include the first volume adjusting spacer.

7. An adjustable evaporative emission system (EVAP) comprising:

a housing comprising:

a first chamber having a first opening and a second opening opposite the first opening, wherein the first chamber has a first chamber maximum capacity to house a fuel vapor filtering medium; and a second chamber having a third opening and a fourth opening opposite the third opening, the third opening is proximate the second opening of the first chamber, wherein the second chamber has a second chamber maximum capacity to house the fuel vapor filtering medium;

a first volume adjusting spacer couplable to at least one of the first chamber and the second chamber proximate the second and third openings such that a flow path of fuel vapor passes therethrough when employed, wherein the first volume adjusting spacer enables the first chamber to house a first volume of the fuel vapor filtering medium; and a second volume adjusting spacer couplable to at least one of the first chamber and the second chamber proximate the second and third openings, wherein the second volume adjusting spacer enables the first chamber to house a second volume of the fuel vapor filtering medium such that the flow path of fuel vapor passes therethrough when employed, and wherein the first volume is greater than the second volume.

8. The adjustable EVAP of claim 7 wherein the first volume adjusting spacer and the second volume adjusting spacer are configured to be snap-fit together.

9. The adjustable EVAP of claim 7 wherein the housing is configured to receive the first volume adjusting spacer and the second volume adjusting spacer to set the first chamber to the second volume.

10. The adjustable EVAP of claim 7 wherein the housing is configured to receive the second volume adjusting spacer, without the first volume adjusting spacer, to set the first chamber to the second volume.

11. The adjustable EVAP of claim 7 further comprising a third volume adjusting spacer couplable to at least one of the first chamber and the second chamber proximate the second and third openings, wherein the third volume adjusting spacer enables the first chamber to house a third volume of the fuel vapor filtering medium, and wherein the second volume is greater than the third volume.

12. The adjustable EVAP of claim 11 wherein the housing is configured to receive the third volume adjusting spacer, without the first and second volume adjusting spacers, to set the first chamber to the third volume.

13. The adjustable EVAP of claim 11 wherein the third volume adjusting spacer is couplable to at least one of the first and second volume adjusting spacers.

14. A method of manufacturing an adjustable evaporative emission system (EVAP) canister comprising:

forming a housing having at least a first chamber and a second chamber, the first chamber having a first opening and a second opening opposite the first opening, the second chamber having a third opening and a fourth opening opposite the third opening, wherein the third opening is proximate the second opening of the first chamber, and wherein the first and second chambers are configured to house a fuel vapor filtering medium;

identifying a size of a fuel tank the adjustable EVAP canister will be coupled thereto, wherein the housing is configured to be employed with different sized fuel tanks;

selecting at least one volume adjusting spacer from a plurality of volume adjusting spacers based at least in part on identifying the size of the fuel tank, wherein the plurality of volume adjusting spacers includes at least a first spacer and a second spacer that is a different size than the first spacer, and wherein the first spacer and the second spacer are couplable to the housing proximate the second opening and the third opening; and coupling the at least one selected volume adjusting spacer to the housing proximate the second opening and the third opening such that a flow path of fuel vapor will pass therethrough, wherein the at least one selected volume adjusting spacer determines, at least in part, a volume of the first chamber.

15. The method of claim 14 wherein coupling the at least one selected volume adjusting spacer to the housing comprises coupling the first spacer to the housing and coupling the second spacer to the housing.

16. The method of claim 15 wherein coupling the second spacer to the housing comprises coupling the second spacer to the first spacer that is coupled to the housing.

17. The method of claim 16 wherein coupling the second spacer to the first spacer comprises snap-fitting the second spacer to the first spacer.

18. The method of claim 15 wherein coupling the first spacer to the housing comprises snap-fitting the first spacer to the housing.

19. The method of claim 14 further comprising:

identifying a different fuel tank size the adjustable EVAP canister will be coupled thereto; and selecting at least one other volume adjusting spacer from the plurality of volume adjusting spacers based at least in part on identifying the different fuel tank size.

20. The method of claim 19 further comprising coupling the at least one other selected volume adjusting spacer to a different housing, wherein the different housing has same dimensions as the housing.

* * * * *